United States Patent
Pech et al.

(10) Patent No.: US 10,003,629 B2
(45) Date of Patent: Jun. 19, 2018

(54) METHOD AND SYSTEM FOR USING JSON WITH A CLI FOR MANAGING NETWORK DEVICES

(71) Applicant: Arista Networks, Inc., Santa Clara, CA (US)

(72) Inventors: Andre Henri Joseph Pech, San Francisco, CA (US); Kenneth James Duda, Santa Clara, CA (US); Ryan Madsen, San Francisco, CA (US); Andrew Fort, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 339 days.

(21) Appl. No.: 14/020,103

(22) Filed: Sep. 6, 2013

(65) Prior Publication Data

US 2014/0337467 A1 Nov. 13, 2014

Related U.S. Application Data

(60) Provisional application No. 61/822,623, filed on May 13, 2013.

(51) Int. Cl.
*G06F 15/16* (2006.01)
*H04L 29/08* (2006.01)
*G06F 9/455* (2018.01)

(52) U.S. Cl.
CPC .......... *H04L 67/02* (2013.01); *G06F 9/45512* (2013.01); *G06F 9/45529* (2013.01)

(58) Field of Classification Search
CPC ......... G06F 17/30424; G06F 17/30477; G06F 17/30569; G06F 17/30979; G06F 9/541; G06F 9/45512; H04L 67/2823; H04L 67/02; H04L 69/08
See application file for complete search history.

(56) References Cited

U.S. PATENT DOCUMENTS

| 9,081,873 B1* | 7/2015 | Bawcom | G06F 17/30477 |
| 2004/0128370 A1* | 7/2004 | Kortright | H04L 41/082 |
| | | | 709/221 |
| 2010/0114336 A1* | 5/2010 | Konieczny | G05B 19/058 |
| | | | 700/17 |
| 2012/0136921 A1* | 5/2012 | Samdadiya | G06F 11/3006 |
| | | | 709/203 |

OTHER PUBLICATIONS

JSON-RPC 2.0 Specification dated Mar. 26, 2010 (8 pages).

* cited by examiner

*Primary Examiner* — Shean Tokuta
*Assistant Examiner* — Kamran Mohammadi
(74) *Attorney, Agent, or Firm* — Chamberlain Hrdlicka (57) ABSTRACT

A method for executing a command line interface (CLI) command by receiving a hyper text transport protocol (HTTP) comprising the CLI command from a controller, extracting the CLI command from the HTTP request, and executing, by a network device, the CLI command to generate a populated model comprising results generated from executing the CLI command. The method also executes the CLI command by converting the populated model into a JSON format using a JSON engine to obtain a JSON result; encapsulating the JSON result in a JSON Remote Procedure Call (RPC), and transmitting the JSON RPC as a HTTP response to the controller.

13 Claims, 7 Drawing Sheets

METHOD AND SYSTEM FOR USING JSON WITH A CLI FOR MANAGING NETWORK DEVICES

CROSS-REFERENCE TO RELATED APPLICATIONS

This application claims priority under 35 U.S.C. § 119(e) to U.S. Provisional Application Ser. No. 61/822,623 entitled "METHOD AND SYSTEM FOR USING JSON WITH A COMMAND LINE INTERFACE FOR MANAGING NETWORK SWITCHES" filed on May 13, 2013. The aforementioned provisional application is here by incorporated by reference in its entirety.

BACKGROUND

Over the lifecycle of a network device, it is common practice to need to change the state (including configuration settings) of the network device, and/or to need to acquire information about the current state of the network device. This may be done by accessing a command line interface (CLI) of the network device and executing CLI commands to change the state of the network device or to obtain information about the state of the network device. Additionally, there have been attempts to develop systems that automate a subset of the functionality that is available via the CLI. These systems typically become obsolete as network device hardware and/or software is updated. Further, these systems are not generally standard and must be modified by users of network equipment to meet the needs of their network environment.

SUMMARY

In general, in one aspect, the invention relates to a system including a controller. The controller includes third-party software that includes functionality to issue a command line interface (CLI) command to a network device. The controller also includes a client library that includes functionality to intercept the CLI command, encapsulate the CLI command as a JavaScript Object Notation Remote Procedure Call (JSON RPC), generate a hyper text transport protocol (HTTP) request that includes the JSON RPC, and issue the HTTP request to the network device. The system also includes a network device executing an agent. The agent is configured to receive the HTTP request, extract the CLI command from the HTTP request, execute the CLI command to populate a model with results generated from executing the CLI command to generate a first populated model, convert the first populated model into a JSON format using a JSON engine to obtain a JSON result, encapsulate the JSON result in a JSON RPC, and transmit the JSON RPC as an HTTP response to the controller.

In general, in one aspect, the invention relates to a method for executing a command line interface (CLI) command by receiving a hyper text transport protocol (HTTP) comprising the CLI command from a controller, extracting the CLI command from the HTTP request, and executing, by a network device, the CLI command to generate a populated model comprising results generated from executing the CLI command. The method also executes the CLI command by converting the populated model into a JSON format using a JSON engine to obtain a JSON result; encapsulating the JSON result in a JSON Remote Procedure Call (RPC), and transmitting the JSON RPC as a HTTP response to the controller.

In general, in one aspect, the invention relates to a non-transitory computer readable medium comprising instructions, which, when executed by a processor, perform a method for executing a command line interface (CLI) command by receiving a hyper text transport protocol (HTTP) request comprising a CLI command from a controller, extracting the CLI command from the HTTP request, and executing, by a network device, the CLI command to generate a populated model comprising results generated from executing the CLI command. The method also executes of the CLI command by converting the populated model into a JSON format using a JSON engine to obtain a JSON result, encapsulating the JSON result in a JSON Remote Procedure Call (RPC), and transmitting the JSON RPC as a HTTP response to the controller.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a network device that includes a command line interface (CLI) that enables both network administrators and third-party software to issue CLI commands to the network device and receive an appropriately formatted result based on the entity that issued the CLI command. More specifically, in one or more embodiments of the invention, the CLI includes functionality to execute CLI commands and return the results of the CLI command as a populated model. The populated model may then be formatted as JSON if the CLI command was issued by third-party software and as ASCII if the CLI command was issued by a network administrator.

Figure 1:
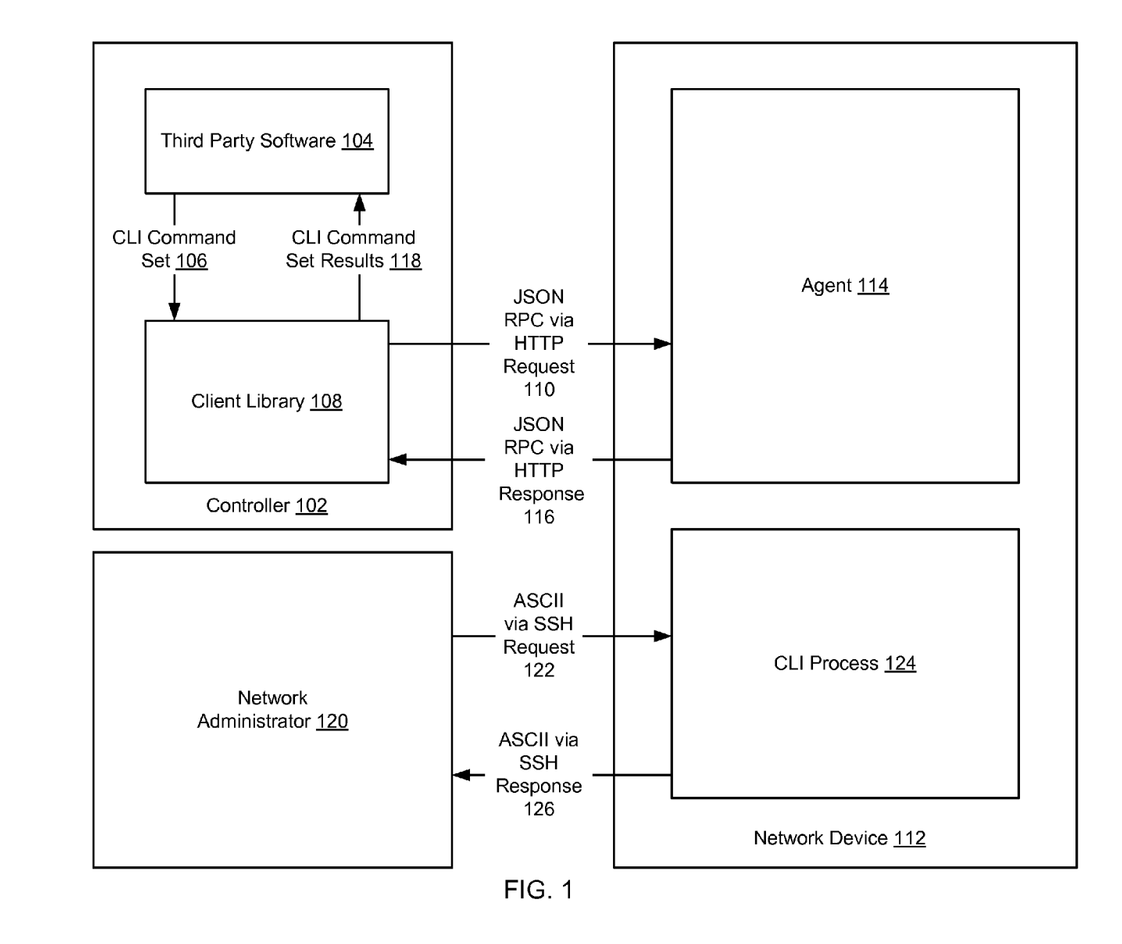
FIG. 1 shows a system in accordance with one or more embodiments of the invention.

FIG. 1 shows a system in accordance with one or more embodiments of the invention. In one embodiment of the invention, the system includes a controller (102) operatively connected to a network device (112) and a network administrator (120) (typically an individual) that is able to access the network device. The controller may include third-party software (104) and a client library (108). The network device (112) may include an agent (114) and a CLI process (124). Each of these components is described below.

In one embodiment of the invention, the controller (102) includes functionality to generate CLI commands and send them to the network device (112), as well as process the results of CLI commands that are received from the network device. In one embodiment of the invention, a CLI command is a pre-defined instruction that the network device (112) is designed to execute, where the result of executing the CLI command results in a state change (e.g., change in configuration of the network device, change in firmware executing on the network device, change in software executing on the network device (e.g., operating system executing on the network device, applications executing on the network device, etc.)) and/or results in providing information about the state of the network device (or a portion thereof). Examples of CLI commands that provide information about the state of the network device is a "show" command, such as "show vlan", which displays information about the virtual local area networks (VLANs) that are configured on the network device, "show mac address table", which displays the contents of the media access control (MAC) address table, and "show interfaces status", which displays details about the status of all interfaces. Example CLI commands that change the state of the network device may include, but are not limited to, the "interface" command, used to configure one or more interfaces on the network device, the "vlan" command, used to configure VLANs on the network device, and the "ip route" command, used to configure static internet protocol (IP) routes on the network device. The invention is not limited to the aforementioned CLI commands.

Figure 4:
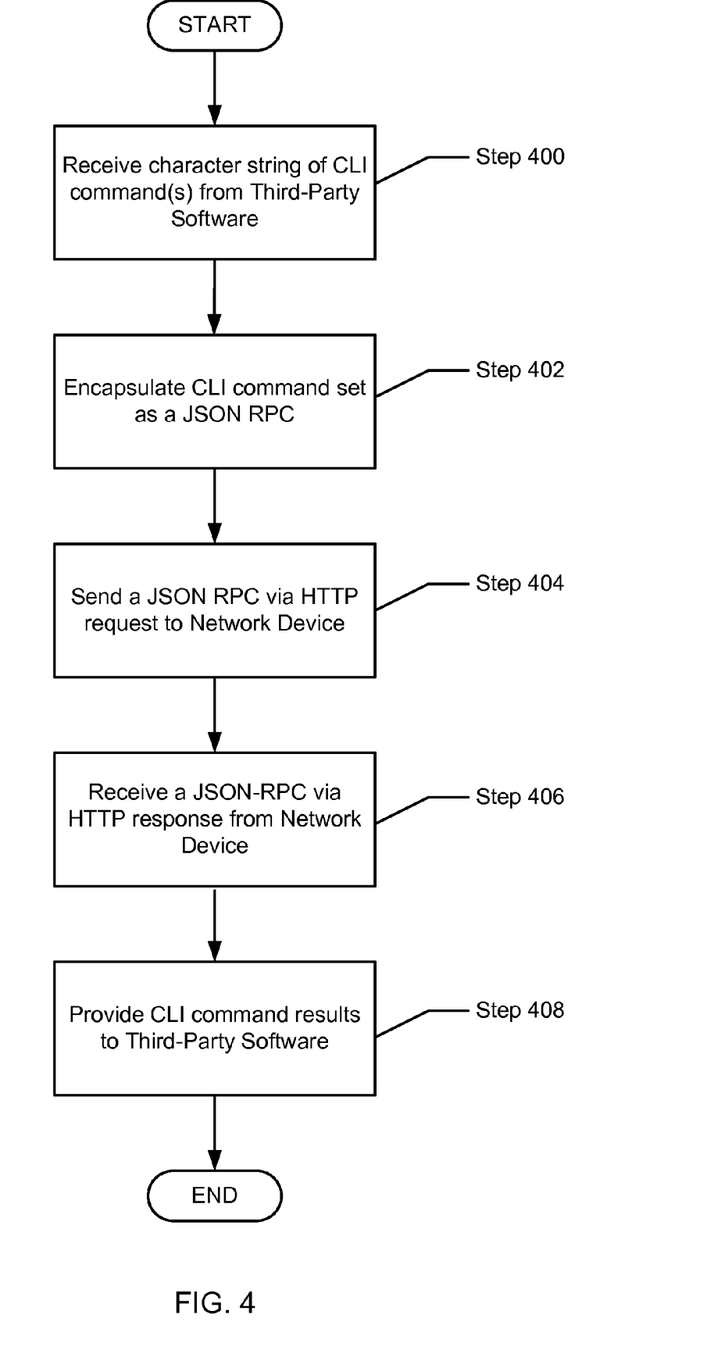
FIGS. 4-7 show flowcharts in accordance with one or more embodiments of the invention.

Continuing with the discussion of FIG. 1, the controller (102) includes functionality to perform the method shown in FIG. 4. The controller (102) may be implemented as a combination of software and storage (volatile and/or persistent storage). Alternatively, the controller (102) may be implemented as a combination of hardware and storage (volatile and/or persistent storage). In another alternative, the controller (102) may be implemented as a combination of hardware, software, and storage (volatile and/or persistent storage).

In one embodiment of the invention, third-party software (104) is a program, an application, a script (or any combination thereof) used for network management activities such as network administration, operation, maintenance, provisioning, recovery, etc. In one embodiment of the invention, the third-party software (104) may be configured to generate and send one or more CLI commands as a CLI command set (106) to a client library (108). In one embodiment of the invention, the CLI command set may be a character string including one CLI command. Additionally, the CLI command set may include a character string with more than one CLI command. In another embodiment, the CLI command set may include multiple character strings each including one or more CLI commands. The third-party software may also include functionality to process the CLI command set results (118) that it receives from the client library. In one embodiment of the invention, the CLI command set results are the results of the CLI commands executed on the network device. For CLI commands that request information about the state of the network device, the results include the requested information. For CLI commands that change the state of the network device, the results indicate the success or failure of the attempt to change the state of the network device and, if there is a failure, error information related to the failed attempt (e.g., information about why the execution of the CLI command failed).

In one embodiment of the invention, the client library (108) is interposed between the third-party software (104) and the network device (112), and facilitates the interaction between the third-party software and the network device. More specifically, the client library is configured to accept the CLI command set (106) from the third-party software (104), and generate and send to an agent running on the network device (112) a JSON RPC via HTTP request (110), where the JSON RPC via HTTP request is generated using the CLI command set. Further, the client library (108) may be configured to receive, from the agent running on the network device (112), a JSON RPC via HTTP response (116) that includes the JSON result and to extract the JSON result and provide it in the form of a CLI command set result (118) to the third-party software (104).

In one embodiment of the invention, Hypertext Transport Protocol (HTTP) is a request-response protocol for exchanging information over a network. HTTP includes functionality to request data e.g., GET request, and functionality to sending data, e.g., POST request. In one embodiment of the invention, CLI commands in the CLI command set (106) that are requesting information about the state of the network device (112) may be sent as GET requests and CLI commands in the CLI command set that change the state of the network device may be sent as POST requests. A JSON RPC is a remote procedure call encoded in JavaScript Object Notation (JSON). In one embodiment of the invention, a JSON RPC via HTTP request includes sending an HTTP request, with the content type defined as JSON, to call a method to be executed on a remote system. A JSON RPC via HTTP request includes a single object serialized using JSON with three properties: (i) method—a string including the name of the method to be invoked on the remote system; (ii) params—an array of objects to be passed as parameters to the defined method; and (iii) id—a value of any type, which is used to match the response to the request it is replying to. In one embodiment of the invention, the method in the JSON RPC via HTTP request (110) may be "run command" method, which is a method for executing the one or more CLI commands in the CLI command set (106) on the network device (112), and the params may be a character string including the one or more commands in the CLI command set. A JSON RPC via HTTP response includes sending an HTTP response, with the content type defined as JSON, to return the results of the method that was executed on the remote system. A JSON RPC via HTTP response includes a single object serialized using JSON with three properties: (i) result—the data returned by the invoked method (if an error occurred while invoking the method, this value is null); (ii) error—a specified Error code if there was an error invoking the method, otherwise null; and (iii) id—the id of the request to which the response corresponds. In one embodiment of the invention, the results of the CLI commands in the CLI command set are returned as a result per CLI command.

In one embodiment of the invention, the results of CLI commands to change the state of the network device may be included in the result property in the JSON RPC via HTTP response and indicate (i) the success or failure of the CLI command attempting to change the state of the network device, and (ii), in the event of a failure, the corresponding error information provided by the network device.

In one embodiment of the invention, the results of CLI commands requesting information about the state of the device may be included in the result property in the JSON RPC via HTTP response (116). The information about the state (referred to as the JSON result in FIG. 2) is structured data, where the structured data may be formatted as a set of <names, value>, any other type of dictionary format, or any other format that included structured data (e.g., a list). In one embodiment of the invention, the client library includes functionality to perform the method shown in FIG. 4.

Returning to the discussion of the controller, the controller (102), may be implemented on a server or client computer operatively connected to the network device (112). In another embodiment of the invention, the controller (102) may be implemented on/in a virtual machine executing on a server or client computer operatively connected to the network device (112).

In one embodiment of the invention, the network administrator (120) is typically an individual that issues CLI commands to the network device (112). In one embodiment of the invention, the network administrator (120) may use a terminal window or console operatively connected to the network device (112) to access a command shell to issue the CLI commands formatted in American Standard Code for Information Interchange (ASCII) via secure shell (SSH), shown in FIG. 1 as an ASCII via SSH request (122), to the CLI process (124) on the network device (112). The network administrator may also receive and review the results of the execution of the CLI commands, shown in FIG. 1 as an ASCII via SSH response (126), via the aforementioned terminal window. Those skilled in the art will appreciate that the network administrator may issue CLI commands to the network device using any type of interface/system that is operatively connected to the network device and includes functionality to issue such CLI commands to the network device.

In one embodiment of the invention, the network device (112) may be may be a switch or router. A switch or a router is a physical device that includes persistent storage, memory (e.g., Random Access Memory), one or more processors, and two or more physical ports. Each port may or may not be connected to another device on a network (e.g., a server, a controller, a switch, a router, etc.). Each network device (112) is configured to receive packets via the ports and determine whether to (i) drop the packet, (ii) process the packet in accordance with one or more embodiments of the invention, or (iii) send the packet out another port on the network device. How the network device (112) makes the determination of whether to drop the packet or send the packet to another device on the network depends, in part, on whether the switch is a layer-2 (L2) network device (e.g., a switch), a layer-3 (L3) network device (e.g., a router), or a multilayer network device. If the network device is operating as a L2 network device, the network device (112) uses the destination MAC address along with a forwarding table to determine out of which port to send the packet. If the network device is operating as a L3 network device, the network device (112) uses the destination IP address along with a routing table to determine out of which port to send the packet. If the network device is a multilayer switch, the multilayer switch includes functionality to process packets using both MAC addresses and IP address.

Figure 5:
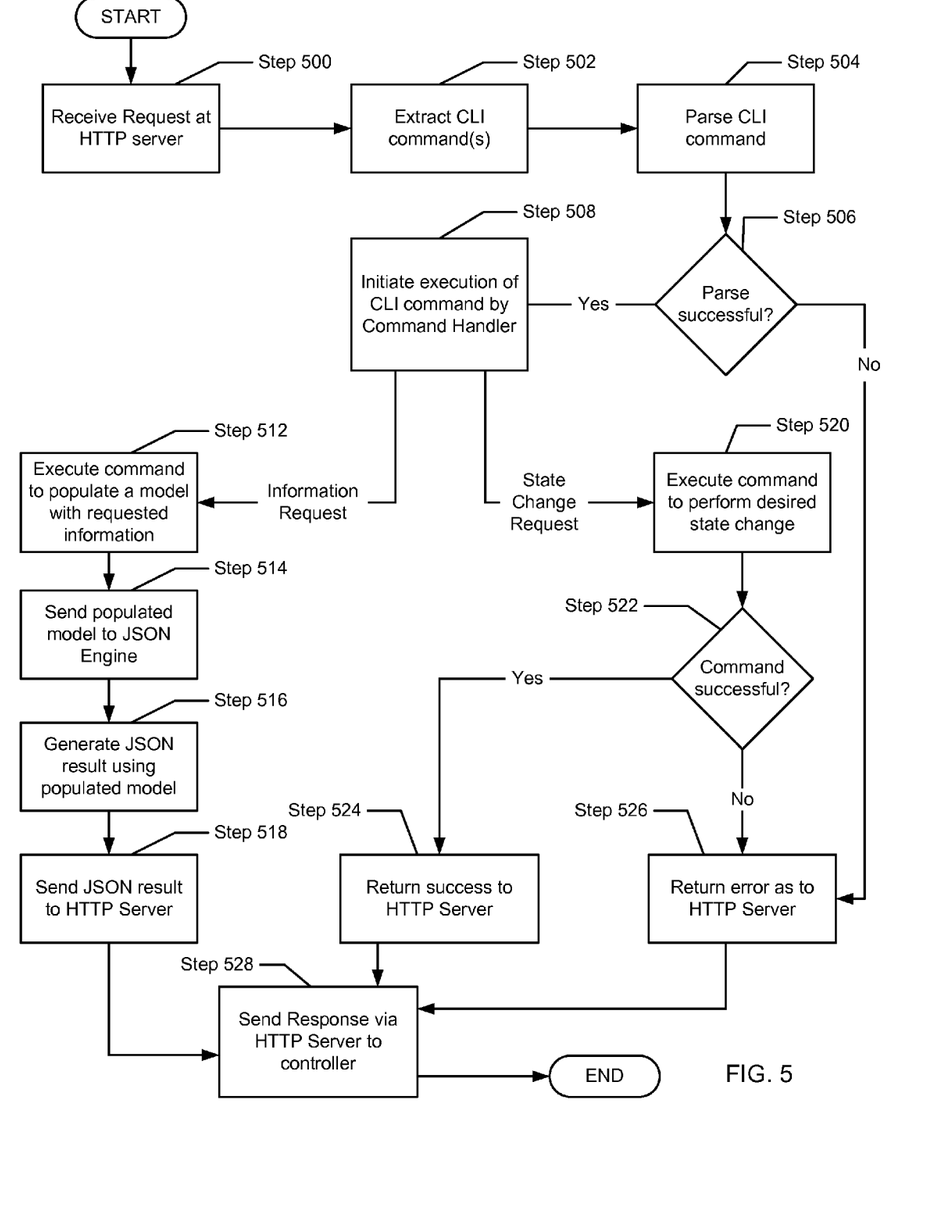
Figure 7:
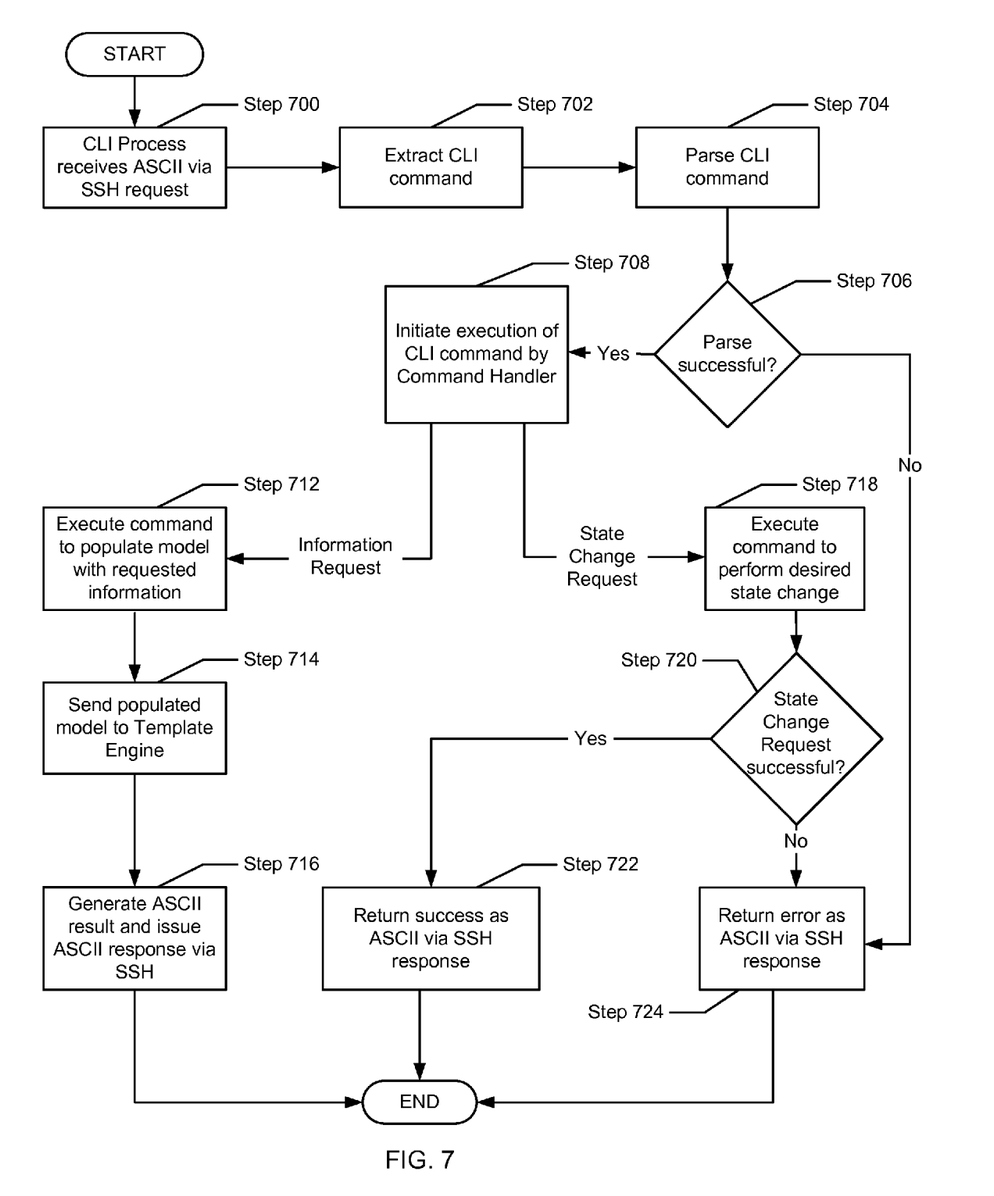

In one embodiment of the invention, the persistent storage in the network device may include any non-transitory computer readable medium that includes instructions, which, when executed by one or more processors in the network device (112), enable the network device to perform the functions described in accordance with one or more embodiments of the invention (see e.g., FIGS. 5 and 7).

In one embodiment of the invention the network device (112) includes functionality to have its state changed or to generate information about its state in response to execution of a CLI command, as well as functionality to return the results of the CLI command to the requesting entity (e.g., controller, network administrator, network management software).

In one embodiment of the invention, the network device (112) may include an agent (114). The agent may be software that executes on the network device and provides an interface for managing the network device. In one embodiment of the invention, the agent includes functionality to perform the method shown in FIG. 5.

In one embodiment of the invention, the network device (112) may include a CLI process (124). The CLI process may be an interface that accepts CLI commands, executes the CLI commands, and returns the results of executing those CLI commands. In one embodiment of the invention, the CLI process may include functionality to perform the method shown in FIG. 7.

The invention is not limited to the system configuration shown in FIG. 1.

Figure 2:
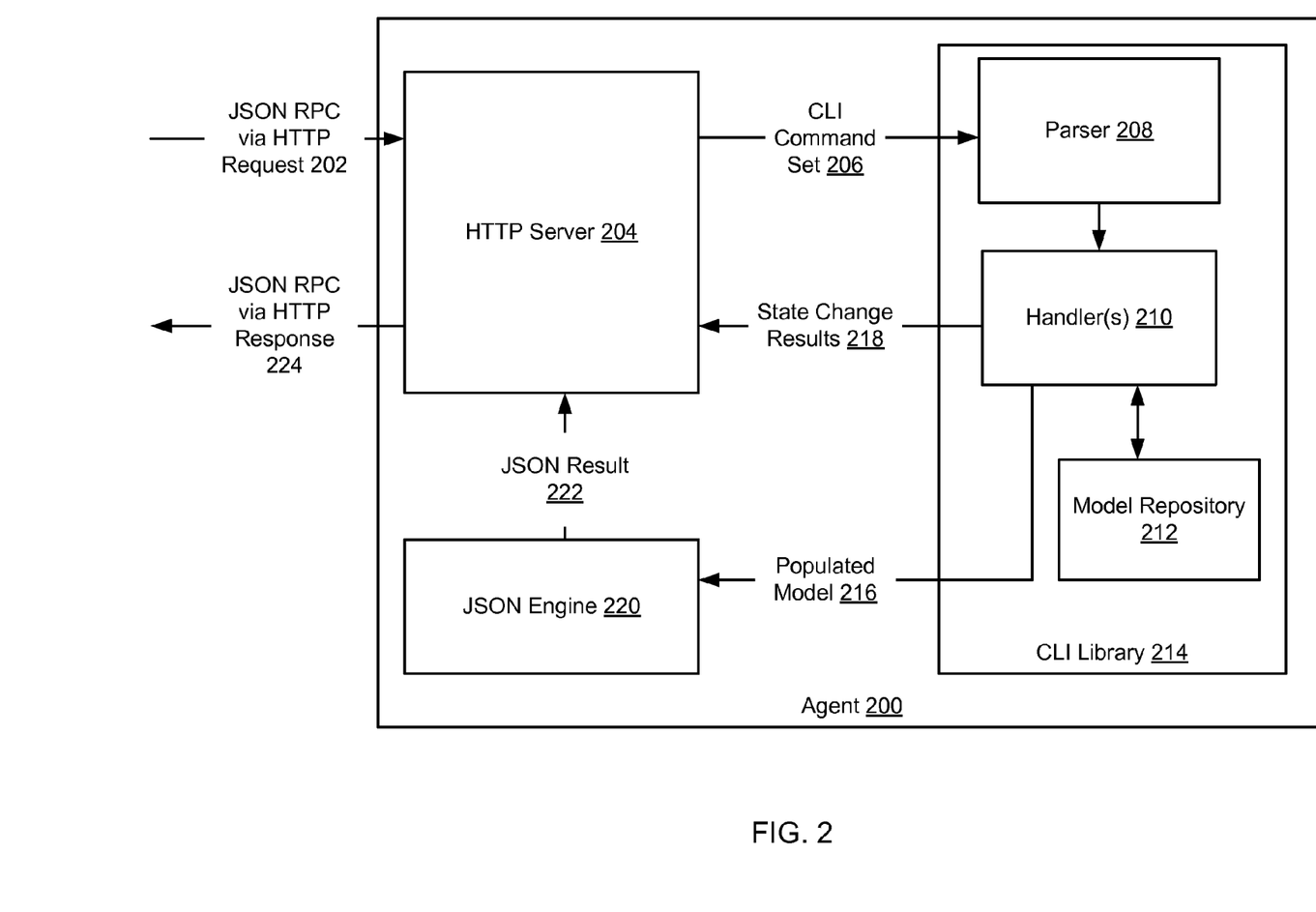
FIG. 2 shows an agent in accordance with one or more embodiments of the invention.

FIG. 2 shows an agent (200) in accordance with one or more embodiments of the invention. The agent includes an HTTP server (204), a CLI library (214), and a JSON engine (220). Each of these components is described below.

In one embodiment of the invention, an HTTP server may be hardware, software, or a combination thereof that includes functionality to receive HTTP requests and send HTTP responses. More specifically, in one embodiment of the invention, the HTTP server (204) includes functionality to receive a JSON RPC via HTTP request (202), as well as send a JSON RPC via HTTP response (224). In one embodiment of the invention, the HTTP server (204) includes functionality to, after receiving the JSON RPC via HTTP request (202) including the CLI command set from the controller, deliver the CLI command set (206) in the request to a parser (208) in the CLI library (214).

In one embodiment of the invention, the CLI library (214) is software that facilitates the execution of the one or more commands in the CLI command set (206) and includes a parser (208), a handler (210) and a model repository (212). A parser is a program that performs a syntactic analysis on a string of symbols. In one embodiment of the invention, the parser (208) includes functionality to determine if the CLI commands provided by the third-party software are syntactically correct and can be executed on the network device. If the parse is successful, the parser is configured to send the one or more CLI commands to a handler (210).

In one embodiment of the invention, the handler (210) is a program configured to execute a CLI command. In one embodiment of the invention, there is one handler for each CLI command. In one embodiment of the invention, if the CLI command is requesting information about the state of the network device, the handler includes functionality to execute the command by instantiating a model (corresponding to the CLI command) from the model repository (212), retrieving the requested information from the network device, populating the model with the requested information (216), and sending the populated model to a JSON Engine (220).

In one embodiment of the invention, the model repository (212) includes the set of models that correspond to one or more CLI commands that the network device is configured to execute. Each model may be associated with one or more CLI commands, while each CLI command may only be associated with a single model. In one embodiment of the invention, each model corresponds to Python dictionary. More specifically, each model when instantiated includes an unpopulated dictionary where the dictionary includes a set of keys but no corresponding values. Each key corresponds to the name of field that is to be included in the JSON result (see FIG. 5, Step 518). For example, the keys may be "name", "ramBytes", "lifetime", "pid", "cpuSeconds" if the CLI command is "show processes."

In one embodiment of the invention, the agent includes a JSON Engine that is configured to format the populated model (216) to generate a JSON result (222), where the JSON result is sent to the HTTP server to be included in a JSON RPC.

Continuing with the discussion of the handler (210), in one embodiment of the invention, if the one or more CLI commands are changing the state of the network device, the handler (210) includes functionality to send the state change results (218) as a JSON result to the HTTP server (204). The state change results (218) may be the success of the state change or the failure of the state change along with any error information associated with the failure. For example, if the CLI command set included a the command as "no vlan 27", which is an attempt to delete a VLAN with a VLAN identification number (VLAN ID) "27", the command handler would execute the command to delete the specified VLAN. If the deletion was successful, then the indication of successful execution of the CLI command would be sent to the HTTP server (204) as a JSON result. If, on the other hand, the attempt to delete the VLAN was unsuccessful, then the indication of the failure and any accompanying error information related to the failed deletion attempt are sent to the HTTP server as a JSON RPC.

In one of embodiment of the invention, the agent may include functionality to determine, before parsing, if the third-party software in the controller in FIG. 1 is authorized to execute on the network device the one or more commands in the CLI command set. If the third-party software is determined not to have appropriate access rights, the one or more commands in the CLI command set will not be executed.

The invention is not limited to the system configuration shown in FIG. 2.

Figure 3:
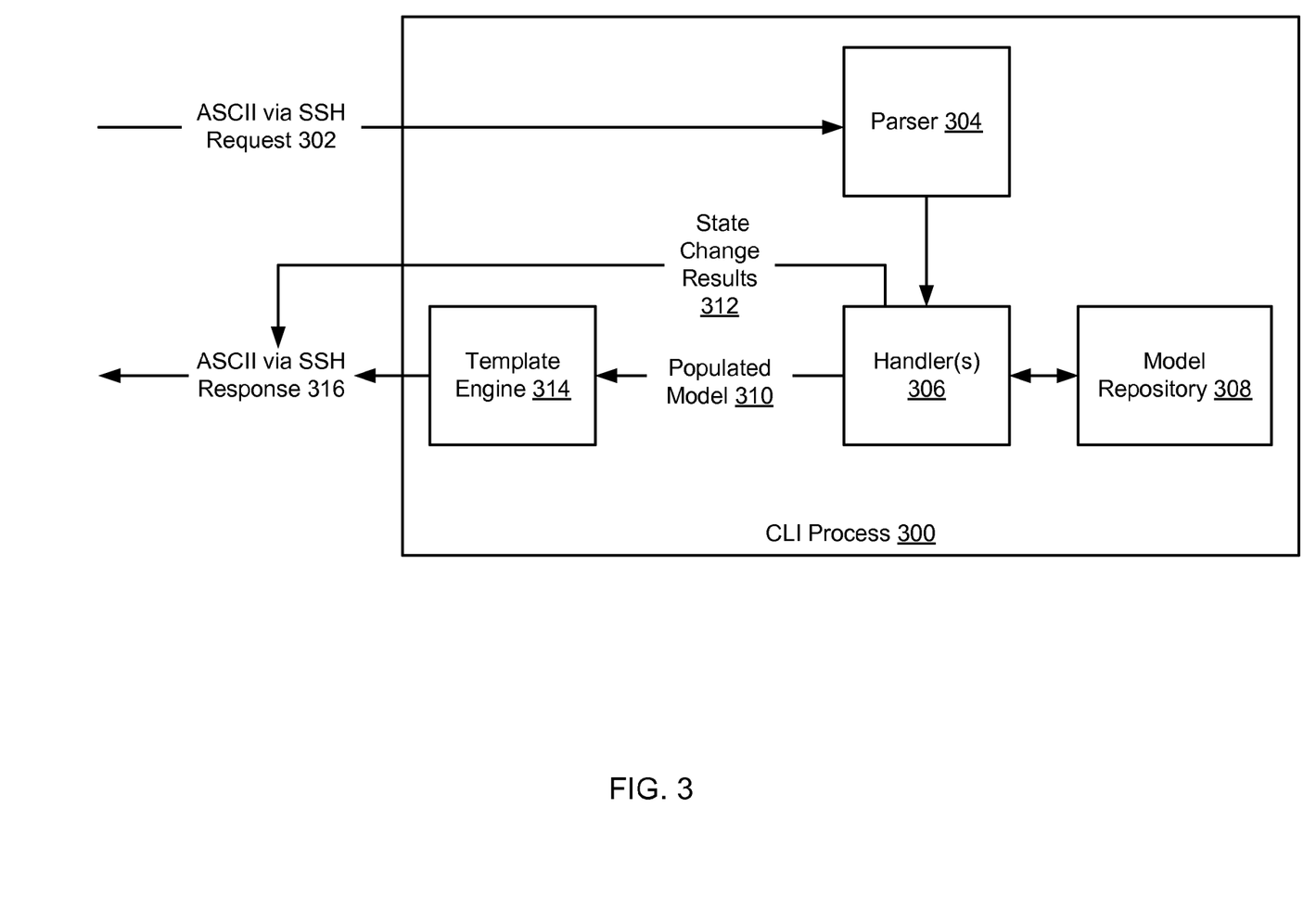
FIG. 3 shows a command line interface (CLI) process in accordance with one or more embodiments of the invention.

FIG. 3 shows a CLI process (300) on the network device in accordance with one or more embodiments of the invention. The CLI process includes, a parser (304), a handler (306), a model repository (308), and a template engine (314). Each of these components is described below.

In one embodiment of the invention, the parser (304) that is configured to receive from the network administrator an ASCII via SSH request (302) including one or more CLI commands, and is also configured send successfully parsed CLI commands to a handler (306). The parser shown in FIG. 3 includes the same functionality as the parser shown in FIG. 2 with respect to the syntactic analysis of the received CLI commands.

In one embodiment of the invention, the handler (306) in FIG. 3 includes the same functionality as the CLI shown in FIG. 2. However, instead of sending the populated model to a JSON engine (as shown in FIG. 2), the handler (306) sends the populated model to a template engine (314). In one embodiment of the invention, there is one handler for each CLI command.

In one embodiment of the invention, the template engine is configured to receive the populated model with the requested information (310), and convert it into ASCII format. Additionally, the template engine may be configured to send an ASCII via SSH response (316) to the network administrator (or more specifically to the system from which the network administrator issued the CLI command(s)).

In one embodiment of the invention, if the handler (306) executes CLI commands to change the state of the network device, the handler sends state change results (312) as ASCII via SSH response (316) to the network administrator (or more specifically to the system from which the network administrator issued the CLI command(s)).

In one embodiment of the invention, the CLI process includes functionality to perform the method shown in FIG. 7. The invention is not limited to the system configuration shown in FIG. 3.

While FIGS. 2 and 3 show separate parsers, model repositories, and handlers for processing CLI commands, embodiments of the invention may be implemented such that there is a single parser, model repository, and set of handlers that is used to process all CLI commands received by the network device regardless of how the CLI commands are provided to the network device. In such cases, the handler is configured to send the populated model to the JSON engine when the corresponding CLI command was received via HTTP and to the template engine when the corresponding CLI command is sent via SSH.

FIGS. 4-7 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4-7 may be performed in parallel with any other steps shown in FIGS. 4-7 without departing from the invention.

Turning to FIG. 4, FIG. 4 shows a flowchart for issuing, to a network device, a CLI command using a JSON RPC via HTTP request in accordance with one or more embodiments of the invention.

In Step 400, a client library running on a controller receives one or more CLI commands from third-party software. In one embodiment of the invention, the third-party software sends one or more CLI commands to the client library as a character string. Alternatively, in one embodiment of the invention, the client library may receive multiple character strings each including one or more CLI commands.

In Step 402, the client library encapsulates the CLI commands received into a JSON RPC and, in Step 404, sends a JSON RPC via HTTP request to the network device. In one embodiment of the invention, if the CLI command set includes commands seeking information about the state of the switch, the HTTP request may be a GET request. If, on the other hand, the CLI command set includes commands to change the state of the network device, the HTTP request may be a POST request. The CLI commands are ultimately received and serviced by the network device. FIG. 5 includes the steps that occur internal to the network device.

Continuing with the discussion of FIG. 4, in Step 406, the controller receives a JSON RPC via HTTP response from the network device including the results of the CLI commands executed on the network device. If the one or more of the CLI commands requested information about the network device state, the response includes the requested information in the result property of the JSON RPC. Alternatively, if a state change was requested, the response includes an indication of success or the failure of the attempted change in the result property of the JSON RPC. If the result of the attempted state change was a failure, the response may also include accompanying error information about the failure. In Step 408, the client library provides the results of the CLI command set to the third-party software. In one embodiment of the invention, the third-party software receives the results of executing the CLI command formatted in JSON.

FIG. 5 shows a flowchart for processing, by a network device, a CLI command set received as a JSON RPC via HTTP request. In Step 500, a JSON RPC via HTTP request is received by an HTTP server on the network device. The request includes one or more CLI commands to be executed. In one embodiment of the invention, the agent may take steps (not shown) to determine that the third-party software has sufficient privileges to request execution of the received CLI commands.

In Step 502, the CLI commands are extracted from the JSON RPC via HTTP request and sent to the parser. In Step 504, the parser parses the CLI commands in the CLI command set. In Step 506, a determination is made about whether the parsing in step 504 was successful. If the parsing in step 504 was successful, the process proceeds to step 508; otherwise, the process proceeds to Step 526. In step 508 the handler initiates execution of the successfully parsed CLI commands. Initiating the execution of the CLI commands may include instantiating a model that corresponds to the CLI command when the CLI command is requesting information about the state of the network device (e.g., the CLI command is a "show" command).

If the CLI command is a command that requests information about the state of the network device, then the process proceeds to Step 512; otherwise, the process proceeds to Step 520. In Step 512, the handler populates the model (which was instantiated in step 508) by executing the CLI to obtain the requested information. In Step 514, the handler sends the populated model to a JSON engine. In Step 516, the JSON engine formats the information in the populated model in to a JSON result (as described above). In Step 518, the JSON engine sends the JSON result to the HTTP server. The process then proceeds to Step 528.

In Step 520, the handler executes the CLI command to cause the requested state change. In Step 522, a determination is made about whether execution of the CLI command was successful. If the execution of the CLI command was successful is successful, the process proceeds to step 524; otherwise, the process proceeds to Step 526.

In Step 524, an indication of successful execution of the CLI command is provided to the HTTP server. For example, commands to cause a state change that produce no output may return an empty JSON result object to the HTTP server when execution of the command to cause the requested state change is successful. The HTTP server subsequently wraps the indication of success (e.g., a notification issued by the CLI library) in a JSON RPC via HTTP response. The process then proceeds to Step 528.

In Step 526, an indication of a failure in the execution of the CLI command is provided to the HTTP server. The HTTP server subsequently wraps the indication of the failure (e.g., a notification issued by the CLI library) along with associated error information related to the failure in a JSON RPC via HTTP response. For example, if the command to cause the requested state change was a "configure" command, and the third-party software that issues the command was not authorized to execute the "configure" command, the resulting JSON RPC via HTTP response is as follows:

Example 1: JSON RPC Via HTTP Response with Error

```
{
"jsonrpc": "2.0",
"error": {
"code": -32001,
"message": "Error executing command 1: 'configure'",
"data": [
{ "errors": [
"Authorization denied for command 'configure'"
] }
]
},
"id": 1
}
```

In this example, a JSON "error" object is returned rather than the JSON "result" object that is returned in the case of successful command execution. The process then proceeds to Step 528.

In Step 528, the results of executing the CLI command are returned to the controller via an HTTP response from the HTTP server. As discussed above, the actual content of the results may vary based on the CLI commands that were executed and the results that were returned.

In one embodiment of the invention, the JSON RPC request received by the agent may include an additional parameter that indicates that the results of executing the CLI commands should be returned as ASCII. In such scenarios, the model populated in step 512 is serialized into ASCII. The resulting ASCII (which is unstructured data) is then wrapped in JSON (as a string of characters) and sent back to the controller using JSON RPC via HTTP.

Figure 6:
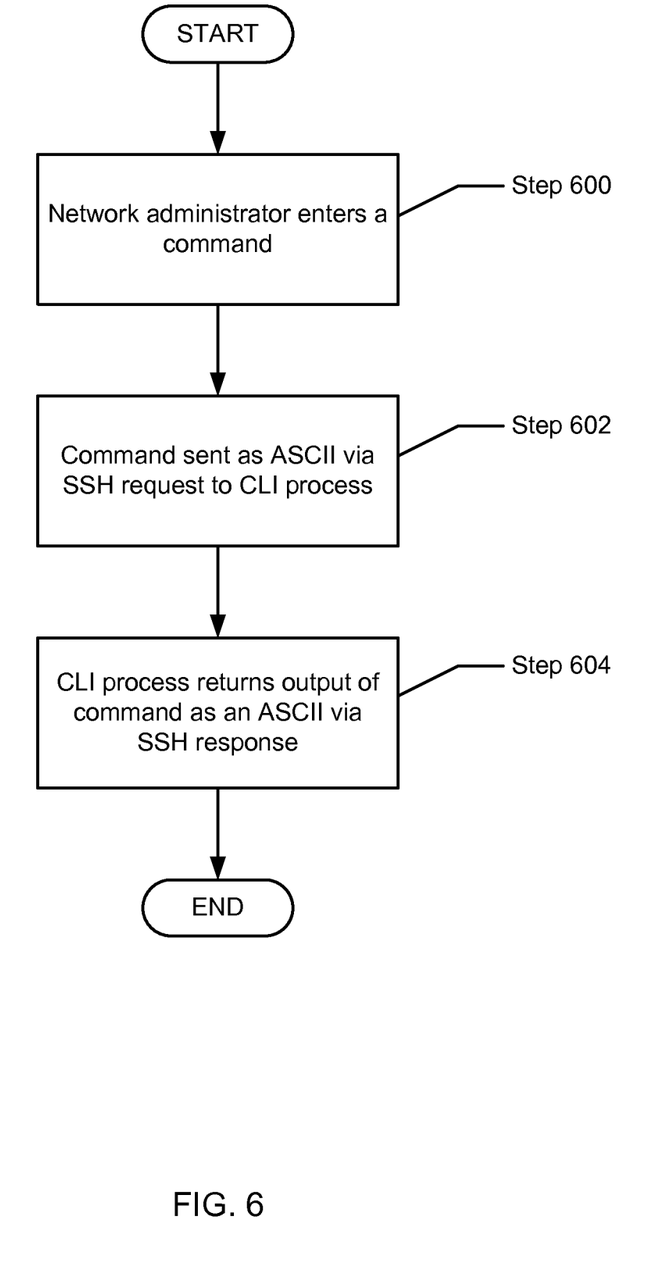

FIG. 6 shows a flowchart for issuing, to a network device, a CLI command in ASCII format via an SSH request. In Step 600, a network administrator with a connection to the network device enters a CLI command(s). In Step 602, the CLI command(s) entered by the network administrator is sent as an ASCII formatted request to the CLI process of the network device via an SSH connection. In Step 604, the CLI process returns the result of the CLI command entered by the network administrator in ASCII format via the SSH connection.

For example, in one or more embodiments of the invention, the network administrator may have an SSH connection to a network switch and type into a terminal window CLI commands such as "show ip interface", "show interfaces status", or "no vlan 27" that the network switch is designed to understand. The "show ip interface" command would display IP information for all interfaces on the network switch in ASCII formatted text in the terminal window that the network administrator is using to issue the commands. The "no vlan 27" command would return to the network administrator as ASCII formatted text the success or failure of the attempt to delete the VLAN with VLAN ID 27 and, in the event of a failure, accompanying error information.

FIG. 7 shows a flowchart for processing, by a network device, a CLI command received as an ASCII formatted request via an SSH connection. In Step 700, an ASCII formatted request sent via SSH is received by the network device's CLI process. The request includes one or more CLI commands of a CLI command set to be executed either to request information about the state of the network device or to alter the state of the network device. In one or more embodiments of the invention, the CLI process may take steps to determine that the third-party software has sufficient privilege to request execution of the one or more CLI commands.

In Step 702, the CLI commands are extracted from the JSON RPC via HTTP request and sent to the parser. In Step 704, the parser parses the CLI commands in the CLI command set. In Step 706, a determination is made about whether the parsing in step 704 was successful. If the parsing in step 704 was successful, the process proceeds to step 708; otherwise, the process proceeds to Step 724. In step 708 the handler initiates execution of the successfully parsed CLI commands. Initiating the execution of the CLI commands may include instantiating a model that corresponds to the CLI command when the CLI command is requesting information about the state of the network device (e.g., the CLI command is a "show" command).

If the CLI command is a command that requests information about the state of the network device, then the process proceeds to Step 712; otherwise, the process proceeds to Step 718. In Step 712, the handler populates the model (which was instantiated in step 708) by executing the CLI to obtain the requested information. In Step 714, the handler sends the populated model to a template engine. In Step 716, the template engine formats the information in the populated model into ASCII (unstructured data) and sends the resulting ASCII to the network administrator via SSH. In Step 718, the handler executes the CLI command to cause the requested state change. In Step 720, a determination is made about whether execution of the CLI command was successful. If the execution of the CLI command was successful, the process proceeds to step 722; otherwise, the process proceeds to Step 724.

In Step 722, an indication of successful is sent in an ASCII format to the network administrator via SSH. In Step 724, an indication of a failure in the execution of the CLI command is sent in an ASCII format to the network administrator via SSH.

In one embodiment of the invention, the ASCII via SSH request received by the CLI process may include an additional parameter that indicates that the results of executing the CLI commands should be returned as JSON. In such scenarios, the model populated in step 712 is converted into a JSON result (i.e., into structured data). The JSON result is then serialized into ASCII. The resulting ASCII (which is unstructured data) is then sent back to the network administrator via SSH.

The following example illustrates various embodiments of the invention, the invention is not intended to limit the scope of the invention.

The following is an example of a JSON RPC via HTTP request that corresponds to the "show interface status" command:

Example 2: JSON RPC Via HTTP Request

```
{
"jsonrpc": "2.0",
"method": "runCmds",
"params": {
"version": 1,
"cmds": [
"show interface status",
],
"format": "json"
},
"id": 1
}
```

The following is an example of a model that corresponds to the "show interfaces status" command:

Example 3: Model for "Show Interface Status" Command

```
class InterfacesStatus( IntfModel.InterfaceBaseModel ):
    class InterfaceStatusEntry( Model ):
        class VlanInformation( Model ):
            vlanId = Int( optional=True, help="Vlan ID if interface is bridged, "
                                              "None otherwise" )
            interfaceMode = Enum( values=( "bridged", "routed", "inactive",
"trunk",
                                           "tap", "tool" ),
                                  optional=True, help="If not in DataLink
mode, what "
                                                      "mode." )
            vlanExplanation =
EthIntfModel.EthPhyInterfaceStatus.interfaceMembership
            interfaceForwardingModel = \
    EthIntfModel.EthPhyInterfaceStatus.forwardingModel
            def getVlanStr( self ):
                if ( self.interfaceForwardingModel and
                        self.interfaceForwardingModel != "dataLink" ):
                    return str( self.vlanId ) if self.interfaceMode ==
"bridged" else \
    self.interfaceMode
                else:
                    return self.vlanExplanation
        description = EthIntfModel.EthPhyInterfaceStatus.description
        linkStatus = EthIntfModel.EthPhyInterfaceStatus.interfaceStatus
        duplex = EthIntfModel.EthPhyInterfaceStatus.duplex
        bandwidth = EthIntfModel.EthPhyInterfaceStatus.bandwidth
```

```
        autoNegotigateActive = Bool( help="Is autonegotiate active" )
        interfaceType = Str( help="Interface Type" )
        vlanInformation = Submodel( valueType=VlanInformation,
                                    help="Model to describe the VLAN
setting" )
    interfaceStatuses = Dict( valueType=InterfaceStatusEntry,
                              help="Collection of interfaces statuses, "
                              "keyed by interface name" )
    def render( self ) :
        # don't print anything if we don't have any interfaces
        if len( self.interfaceStatuses ) == 0:
            return
        fmt = "%-10.10s %-17.17s %-12.12s %-11.11s %6.6s %6.6s %-12.12s"
        print fmt % ( "Port", "Name", "Status", "Vlan", "Duplex", "Speed",
"Type" )
        for interface in sorted( self.interfaceStatuses,
                                 cmp=Arnet.compareIntfName ):
            interfaceStatusEntry = self.interfaceStatuses[ interface ]
            duplex = EthPhyIntf.showIntStatusDuplexStr(
    interfaceStatusEntry.autoNegotigateActive,
                                        interfaceStatusEntry.duplex )
            bandwidth = EthIntf.showIntStatusSpeedStr(
interfaceStatusEntry.autoNegotigateActive,
                                        interfaceStatusEntry.bandwidth )
            print fmt % ( IntfCli.Intf.getShortname( interface ),
                          interfaceStatusEntry.description,
                          interfaceStatusEntry.linkStatus,
                          interfaceStatusEntry.vlanInformation.getVlanStr( ),
                          duplex, bandwidth,
interfaceStatusEntry.interfaceType )
```

The following is an example of the JSON result that is generated by the JSON engine using the model populated with information resulting from executing the "show processes" command:

Example 4: JSON Result for "Show Process" Command

```
{"command": "show processes",
 "result": [
    {"name": "/sbin/init", "ramBytes": 999424,
     "lifetime": 22982.89, "pid": 1, "cpuSeconds": 1.64},
    {"name": "Sysdb", "ramBytes": 55463936,
     "lifetime": 157.58, "pid": 3229, "cpuSeconds": 6.52},
    {"name": "Cli [interac", "ramBytes": 69357568,
     "lifetime": 73.21, "pid": 4228, "cpuSeconds": 3.73},
    {"name": "Lag+LacpAgent", "ramBytes": 29245440,
     "lifetime": 137.10, "pid": 3429, "cpuSeconds": 1.95} ] }
```

The following is an example of the ASCII that is generated by the template engine using the model populated with information resulting from executing the "show interfaces status" command:

Example 5: ASCII

| Port Name | Status | Vlan | Duplex | Speed | Type |
|---|---|---|---|---|---|
| Et1 | connected | 1 | a-full | a-1G | 1000BASE-T |
| Et2 | connected | 1 | a-full | a-1G | 1000BASE-T |
| Et3 | connected | 1 | a-full | a-1G | 1000BASE-T |
| Et4 | connected | 1 | a-full | a-1G | 1000BASE-T |
| Et5 | connected | 1 | a-full | a-1G | 1000BASE-T |
| Et6 | connected | 1 | a-full | a-1G | 1000BASE-T |
| Et7 | connected | 1 | a-full | a-1G | 1000BASE-T |
| Et8 | connected | 1 | a-full | a-1G | 1000BASE-T |
| Et9 | connected | 1 | a-full | a-1G | 1000BASE-T |
| Et10 | connected | 1 | a-full | a-1G | 1000BASE-T |
| Et11 | connected | 1 | a-full | a-1G | 1000BASE-T |
| Et12 | connected | 1 | a-full | a-1G | 1000BASE-T |
| Et13 | notconnect | 1 | auto | auto | 1000BASE-T |
| Et14 | notconnect | 1 | auto | auto | 1000BASE-T |
| Et15 | notconnect | 1 | auto | auto | 1000BASE-T |
| Et16 | notconnect | 1 | auto | auto | 1000BASE-T |
| Et17 | notconnect | 1 | auto | auto | 1000BASE-T |
| Et18 | notconnect | 1 | auto | auto | 1000BASE-T |
| Et19 | notconnect | 1 | auto | auto | 1000BASE-T |
| ... | | | | | |

One skilled in the art will recognize that though JSON RPC is used in the preceding description as the format for encoding character strings of CLI commands, requesting execution of CLI commands on remote network devices, and receiving the results (requested information or results of state change) of those CLI commands in response, encodings other than JSON RPC may be used without departing from the invention. For example, the marshal module might be preferred in some scenarios due to different timing for encoding and decoding information that it sends and/or receives. Additionally, one skilled in the art will recognize that though HTTP is used in the preceding description as the transport protocol for the JSON RPC requests and responses, other transport protocols may be used without departing from the invention. For example, HTTP secure (HTTPS) may be used, which provides a more secure transport protocol for exchanging information over a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a controller implemented on a computer and comprising:
software executing on the computer and configured to issue a command line interface (CLI) command to a network device;
a client library executing on the computer and configured to:
intercept the CLI command;
encapsulate the CLI command as a JavaScript Object Notation Remote Procedure Call (JSON RPC);
generate a hyper text transport protocol (HTTP) request that includes the JSON RPC; and
issue the HTTP request to the network device; and
a network device operatively connected to the controller and executing an agent, wherein the agent is configured to:
receive the HTTP request;
execute the CLI command extracted from the HTTP request to populate a model associated with the CLI command to generate a first populated model;
convert the first populated model into a JSON format using a JSON engine to obtain a JSON result;
encapsulate the JSON result in a JSON RPC;
transmit the JSON RPC as an HTTP response to the controller;
receive, from a network administrator, a secure shell (SSH) request comprising the CLI command,
execute the CLI command extracted from the SSH request to populate the model associated with the CLI command to generate a second populated model;
convert the second populated model into an American Standard Code for Information Interchange (ASCII) format using a template engine to obtain an ASCII result; and
transmit, via SSH, the ASCII result to the network administrator.

2. The system of claim 1, wherein the HTTP request is sent to the network device using one selected from a group consisting of Hypertext Transfer Protocol (HTTP) and HTTP Secure (HTTPS).

3. The system of claim 1, wherein the HTTP request includes a set of CLI commands, wherein the CLI command is one of set of CLI commands.

4. The system of claim 1, wherein the first populated model is in one selected from a group consisting of a list format and a dictionary format.

5. The system of claim 1, wherein the agent is further configured to:
prior to extracting the CLI command from the HTTP request, determine that the software has sufficient privileges to issue the CLI command.

6. The system of claim 1, wherein executing the CLI command comprises:
parsing the CLI command to obtain a parsed CLI command; and
executing the parsed CLI command.

7. The system of claim 1, wherein the JSON RPC response is sent to the network device using one selected from a group consisting of Hypertext Transfer Protocol (HTTP) and HTTP Secure (HTTPS).

8. The system of claim 1, wherein the CLI command is one selected from a group consisting of a request for state information of the network device and a request to change the state of the network device.

9. A method for executing a command line interface (CLI) command, comprising:
receiving, at a network device and from a controller, a hyper text transport protocol (HTTP) request comprising the CLI command encapsulated as a JavaScript Object Notation Remote Procedure Call (JSON RPC);
executing, by an agent executing on the network device, the CLI command extracted from the HTTP request to generate a first populated model, wherein the first populated model is generated based on a model associated with the CLI command;
converting the first populated model into a JSON format using a JSON engine to obtain a JSON result;
encapsulating the JSON result in a JSON Remote Procedure Call (RPC);
transmitting the JSON RPC as a HTTP response to the controller;
receiving, at the network device and from a network administrator, a secure shell (SSH) request comprising the CLI command,
executing, by an agent executing on the network device, the CLI command extracted from the SSH request to populate the model to generate a second populated model;
converting the second populated model into an American Standard Code for Information Interchange (ASCII) format using a template engine to obtain an ASCII result; and
transmitting, via SSH, the ASCII result to the network administrator.

10. The method of claim 9, wherein the CLI command is received from software executing on the controller.

11. The method of claim 10, wherein the software is network device management software.

12. The method of claim 9, wherein the first populated model is in one selected from a group consisting of a list format and a dictionary format.

13. A non-transitory computer readable medium comprising instructions, which when executed by a processor, perform a method, the method comprising:
receiving, at a network device and from a controller, a hyper text transport protocol (HTTP) request comprising a CLI command encapsulated as a JavaScript Object Notation Remote Procedure Call (JSON RPC);
executing, by an agent executing on the network device, the CLI command extracted from the HTTP request to generate a first populated model, wherein the first populated model is generated based on a model associated with the CLI command;
converting the first populated model into a JSON format using a JSON engine to obtain a JSON result;
encapsulating the JSON result in a JSON Remote Procedure Call (RPC);
transmitting the JSON RPC as a HTTP response to the controller;
receiving, at the network device and from a network administrator, a secure shell (SSH) request comprising the CLI command;
executing, by an agent executing on the network device, the CLI command extracted from the SSH request to populate the model to generate a second populated model;
converting the populated model into an American Standard Code for Information Interchange (ASCII) format using a template engine to obtain an ASCII result; and
transmitting, via SSH, the ASCII result to the network administrator.

* * * * *